Dec. 8, 1936.  O. G. TWEDDELL  2,063,414
HYDRAULIC FEED FOR MACHINE TOOLS
Filed Nov. 17, 1933  3 Sheets-Sheet 1
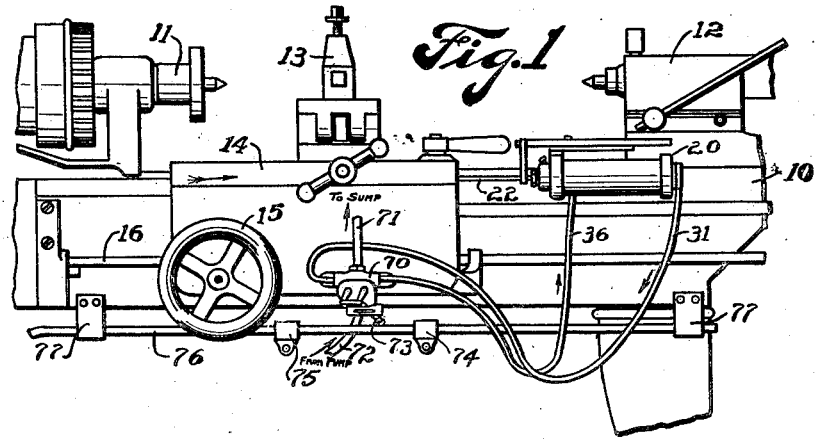
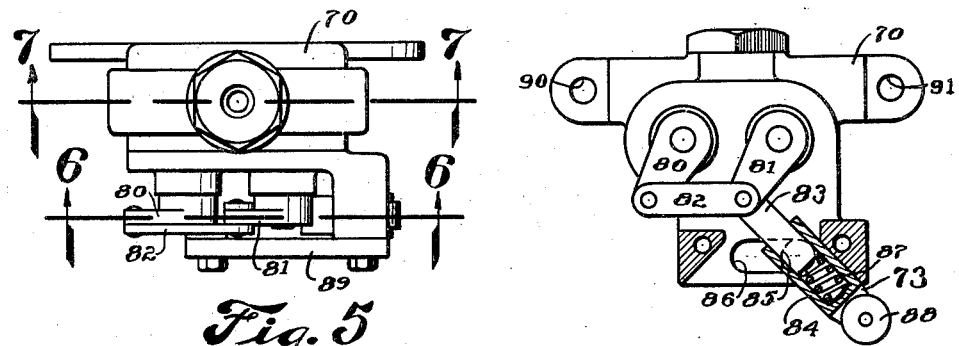
INVENTOR.
OSCAR G. TWEDDELL
BY Joseph Farley
ATTORNEY.

Dec. 8, 1936.  O. G. TWEDDELL  2,063,414
HYDRAULIC FEED FOR MACHINE TOOLS
Filed Nov. 17, 1933  3 Sheets-Sheet 3

INVENTOR.
OSCAR G. TWEDDELL
BY
ATTORNEY.

Patented Dec. 8, 1936

2,063,414

UNITED STATES PATENT OFFICE 2,063,414

HYDRAULIC FEED FOR MACHINE TOOLS

Oscar G. Tweddell, Detroit, Mich., assignor of one-third to Victor R. Heftler, Grosse Pointe Park, Mich.

Application November 17, 1933, Serial No. 698,403

3 Claims. (Cl. 121—45)

This invention relates to a means of control for hydraulic motors of either reciprocating or rotating type. A particular application is found in the metal working arts where such mechanisms are used to move cutting tools relative to work in machining operations such as turning, milling, boring, planing, etc. It is a distinct advantage in such work to provide variation in the speed at which the tool is moved during different steps in any given cycle of operations which the setup may require. For instance it is often required that a tool be fed longitudinally to cut for a short distance and then be moved along by the carriage idle to the next portion to be cut. Under such conditions a great saving in time may be effected if the tool moves rapidly to the next cut and then slows down to a satisfactory operating speed at the point of cut. Furthermore after a series of such operations is completed and the end of the carriage traverse is reached, it is not enough that the carriage simply reverse its series of operations at the previous forward speed and slowly return itself to the starting point, but it must reverse quickly in order that its time of idle movement shall be a minimum.

It is an important object of this invention to provide a construction in which a simple control unit is used to control the flow of the actuating fluid to or from the fluid pressure motor depending upon the direction of travel of the carriage. This means of control makes it unnecessary to rely on variation in pump output for control of the rate of feed.

It is an object of the present invention to provide an improved and simplified construction of relatively low cost for a hydraulic carriage feeding mechanism which will provide for variations in speed over a given traverse of said carriage and furthermore provide means whereby an infinite number of combinations of slow and fast speeds in any desired series may be obtained with only slight mechanical changes in the mechanism.

It is also an object to combine the above with a means to reverse the travel of the carriage when the end of its traverse is reached and to bring the carriage back to its starting point at a high speed so that a cycle of operations will be completed in a minimum of time.

Another object is to provide a control means having a main control valve capable of being quickly and automatically actuated to produce relatively large variations in the feeding rate in combination with a manually adjustable valve for securing very minute and accurate changes or adjustments of the feeding rate.

It is an important object of this invention to provide a mechanism capable of accomplishing the desired results while maintaining a simplicity of construction and cheapness of manufacture such that it will be of great practical value on modern production equipment.

For the purposes of illustration an embodiment of the invention as applied to a conventional lathe carriage is described in this specification and its accompanying drawings. It is to be understood that this simple application is selected only as a means to clarify the description and emphasize the fundamental principles which in practice may be applied to many varied and more complicated mechanisms to be found in modern production machines. In fact it is fully appreciated that since the invention is broadly applicable to any mechanical unit requiring a repeated series of intermittent slow and fast reciprocating carriage movements, there are no doubt innumerable applications for the invention which are not now apparent. It is essential therefore that it be fully understood that the scope of this invention is not confined to the specific application herewith described nor alone to the metal working art.

The above and further objects of the invention will be evident from the following detailed description and by reference to the accompanying drawings in which like reference characters designate the same parts in the several figures.

Fig. 1 shows a side view of a conventional lathe with the hydraulic feed mechanism of this invention attached.

Fig. 5 is a top view of the reversing valve.

Fig. 6 is a section on the line 6—6 of Fig. 5.

Fig. 7 is a section on the line 7—7 of Fig. 5.

Figure 2:
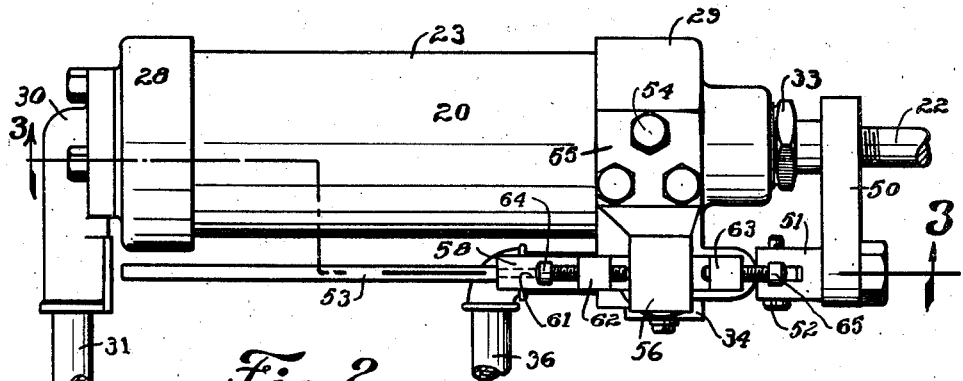
Fig. 2 is a top view of the cylinder and control valve.

Referring to Fig. 1 a conventional lathe is shown having a bed 10, headstock 11, tailstock 12, tool holder 13 and a carriage 14 mounted on the bed 10 for longitudinal movement. In operation the work is rotated between the centers on headstock 11 and tailstock 12 while the carriage 14 with the tool mounted thereon is fed longitudinally to remove stock from the rotating work. In the conventional lathe the movement of the carriage may be effected manually by the handwheel 15 or by a system of gearing causing rotation of a feed screw such as 16.

Briefly it is the purpose in this invention to use a hydraulically operated cylinder and piston 20 connected to the carriage 14 by connecting rod 22 for moving the carriage. Or instead of using what might be termed a reciprocating hydraulic motor, as described above, a rotary hydraulic motor such as 120 (see Fig. 8) may be used, in which case the rotary motor might simply be attached to rotate the feed screw 16 and thereby cause longitudinal movement of the carriage. It is essential to remember that the principles of this invention may be applied in the same manner whichever of these types of hydraulic motors is used.

Figure 3:
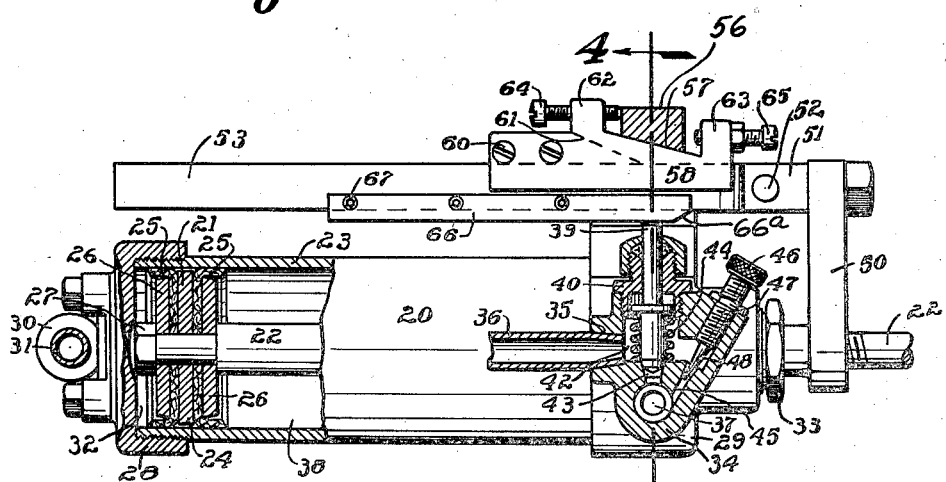
Fig. 3 is a side view, partly in section on the line 3—3 of Fig. 2 of the cylinder and control valve.
Figure 4:
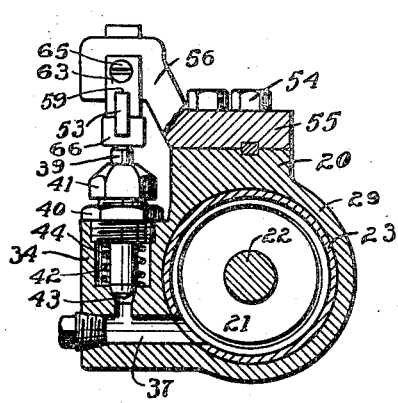
Fig. 4 is a section through the control valve and cylinder taken on the line 4—4 of Fig. 3.

The details of the cylinder and piston unit 20, as shown in Figs. 2, 3 and 4, will first be described. The cylinder 23 has fitted therein a piston 21 made up of circular disk 24, annular packing rings or leathers 25, and washers 26, all held in place on connecting rod 22 by means of nut 27. The cylinder 23 is closed at its ends by cylinder heads 28 and 29 provided with threads for engagement with cylinder 23. The head 28 has provision for the attachment thereto of a fitting 30 which serves for connecting to the cylinder a tube 31 in such manner that fluid under pressure may be admitted through the end of the cylinder to chamber 32 at the left of piston 21, as shown in Fig. 3.

Connected to the other cylinder head 29 is a fitting 33 provided with conventional packing for the passage of the connecting rod 22. There is also a valve housing 34 cast integral with the head 29, said housing having a threaded opening 35 for attachment of tube 36 so that fluid under pressure may be admitted through valve housing 34 into passage 37 and therethrough into chamber 38, at the right of piston 21 as shown in Fig. 3.

Within the valve housing 34 is provided mechanism for control of fluid passing therethrough comprising a plunger 39 mounted for vertical movement in a bushing 40 and cap 41 and having the end of said plunger extending outside of cap 41, suitable packing material for completing a pressure tight joint being provided. The beveled lower end of plunger 39 is so shaped as to form a complete closure of opening 43 with full downward movement of plunger 39. However, a spring 44 is provided to hold plunger 39 away from opening 43 and it is apparent that an orifice of variable area will be effected at the said opening 43 when plunger 39 is held at various vertical positions by pressure exerted at the top end of said plunger in a manner to be later explained.

At 45 there is provided a second connecting passage between chambers 37 and 42 and cooperating with this connecting passage 45 is a feed control needle valve 46 mounted in valve housing 34 and provided with conventional lock nut 47. The passage 45 is so tapered to cooperate with the tapered end 48 of the needle valve 46 to vary the effective area of the opening in the conventional manner.

An arm 50 is secured to connecting rod 22 by any suitable means so that it moves with said connecting rod 22. Secured to said arm 50 is a bracket 51 provided with a pivot pin 52 upon which cam blade 53 is mounted. Suitably secured by screws 54 to cap 29 is a bracket 55 having a projection 56 having its under surface formed at an angle as shown at 57. This surface 57 contacts a cam shoe member 58 having a like angularly disposed surface. This cam shoe member is provided with a groove 59 (Fig. 4) and fitted to slide on cam blade 53 with a certain amount of friction obtained by adjustment of screws 60 located opposite slot 61.

Extending upward from cam shoe 58 on either side of projection 56 are two lugs 62 and 63 providing mountings for adjusting screws 64 and 65.

A cam 66 is secured to the under surface of cam blade 53 by means of set screws 67. This cam is so designed as to contact the upper end of plunger 39 for a purpose which will be hereinafter more fully explained.

As shown in Fig. 1, tubes 31 and 36 connect with reversing valve 70 and are connected therethrough to sump line tube 71 and pump line tube 72 respectively or in reverse hookup to pump line tube 72 and sump line tube 71 respectively depending on the position of lever 73.

For actuation of lever 73 suitable contacting trip members 74 and 75 are provided at points in the carriage travel where reversal is desired. These members are shown secured, in this installation, to a rod or bar 76 secured to the lathe bed by brackets 77.

The details of the reversing valve are shown in Figs. 5, 6 and 7. As shown in Fig. 7 the interior of the valve is provided with two rotatable valve members 78 and 79 in which are provided drilled passages 101, 102, 106 and 107 which are aligned with suitable fixed passages 100, 103, 104, 105, 108 and 109 to the desired connections. The two valve members are located in two operating positions by the linkage shown in Fig. 6 in which levers 80 and 81 are secured to valve members 78 and 79, said levers being connected together by bar 82. To actuate this double lever hookup a telescoping trip lever is provided comprising a stub lever 83 connected at its upper end to the pivot which joins the lever 81 to one end of bar 82 and a hollow lever 84 pivoted on a pin 85 extending into slot 86. A spring 87 is provided inside hollow lever 84 which reacts against the end of stub lever 83. A roller 88 may be provided for contacting the trip members 74 and 75. A guide or guard plate 89 is secured alongside lever 84 as shown. Bolt holes are provided at 90 and 91 for the securing the reversing valve in place on the lathe.

Considering Fig. 7, opening 71a connects with sump line tube 71, opening 72a connects with pump line tube 72, opening 36a with tube 36, and opening 31a with tube 31. With the valve members in the position shown in Fig. 7 the sump opening 71a is connected with opening 31a through passages 100, 101, 102 and 103 while pump opening 72a is connected with opening 36a through passages 105, 107 and 109. When the linkage of Fig. 6 is reversed sump connection 71a will be connected with opening 36a through passages 108, 107, 106 and 109 while pump opening 72a will be connected with opening 31a through passages 104, 101 and 103.

The mechanism operates as follows: A constant fluid pressure is maintained in the pump line 72 by any suitable pump hookup. In the position shown in Fig. 1 the carriage 14 is in the reversing operation, that is to say, it is moving toward the right and away from the work. As indicated by the position of the lever 73, and by reference to Figs. 6 and 7, it will be seen that pump line 72 is connected to tube 36 and sump line 71 to tube 31. In this position fluid under pressure will thereby be forced into the left hand chamber of the cylinder 20 (Fig. 1) and the carriage will therefore move to the right.

As the carriage reaches the position wherein lever 73 trips against trip member 74, the reversing valve will be forced to the feeding position, not shown, wherein pump line 72 will be connected with tube 31 and sump line 71 connected with tube 36. In this position the fluid under pressure will enter the cylinder 20 (Fig. 1) at the right hand side thereof and the carriage therefore will be driven to the left.

As will appear from Fig. 3, as the connecting rod 22 moves out of the cylinder 20 cam blade 53 moves in the same direction. By reason of the frictional engagement between cam shoe 58 and cam blade 53, cam shoe 58 is likewise urged in the same direction. The engagement of cam shoe 58 with the inclined surface 57 forces cam shoe 58 and cam blade 53 downwardly into operative position, which downward movement continues until the movement of cam shoe 58 is arrested by contact of the set screw 64 with the projection 56 of bracket 55.

Before considering the operation of valve 34 it should first be considered that with movement of piston 21 and connecting rod 22 the cam blade 53 is pulled through the cam shoe 58 and carries with it cam 66. Before travel of cam blade has caused cam 66 to make contact with the top of plunger 39 (see Fig. 3) said plunger will be forced upward by spring 44 and the large opening 43 will be open to allow a relatively large amount of fluid to pass through valve 34 and therefore the rate of feed will be fast. This will be the condition when the carriage is moving "up to the cut" and will materially save time by this speeding up of the feed.

The cam 66 is so placed on the cam blade 53 that it will contact plunger 39 and force it downward at the point where the cut begins and it is evident that there will be an immediate slowing up of the feed because of the closing of opening 43. The feed is then regulated by the flow allowed through the needle control valve 46 and may be nicely adjusted by this means.

When the carriage has come to the end of the traverse desired and the reversing valve lever 73 (see Fig. 1) comes in contact with trip member 75 the pump pressure will be forced into tube 36 and tube 31 will be connected with the sump. The fluid will be pumped directly through valve 34 into chamber 38, the valve 34 in this case controlling the flow of fluid entering the cylinder while in the former case it maintained control of fluid leaving the cylinder. It is evident that reversal of flow causes reversal of feed and the movement carries cam blade 53 toward the left in Fig. 3. Since screw 65 is backed away and cam shoe 58 follows movement of cam blade 53 by a frictional slipping contact, the change on inclined surfaces at 57 will immediately allow cam blade 53 and cam 66 to rise and likewise release plunger 39 thereby causing a speeding up of feed in reverse and therefore reduce the time required to make the machine ready to start another forward cycle.

It is of course to be understood that the present example is only a sample of the varied setups which could be made. The invention contemplates the use of a plurality of cams on the cam blade to intermittently speed up and slow the feed. By variation in design and location of cams an infinite number of combinations may be made.

It is now apparent that my device provides a cycle of operation which may be controlled consecutively by three different combinations of the mechanism; (1) approach feed automatically variable by the face of cam 66, controlling the plunger 39 and opening 43 and manually adjustable by adjusting screw 64; (2) positive feed with opening 43 closed and feed therefor controlled by flow through passage 45 of needle valve 46 which is capable of manual adjustment; (3) automatic rapid reverse feed over the entire forward cycle accomplished by the inclined surfaces at 57 which allows upward movement of plunger 39 in an amount controlled manually by adjusting screw 65.

Figure 8:
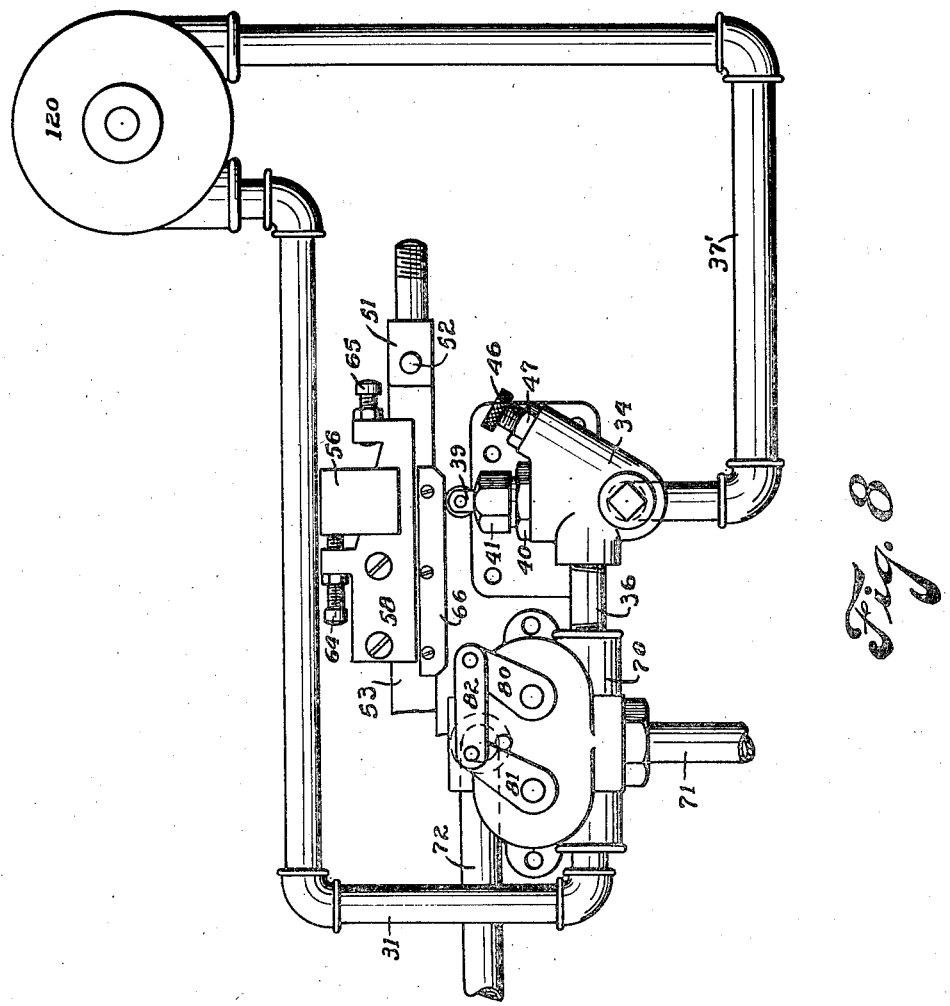
Fig. 8 shows a view of a modified setup using the principles of my invention.

The above description has been confined to a reciprocating unit but no change in fundamental principles of my invention are involved by the substitution of a rotary motor 120 (Fig. 8) for the reciprocating cylinder and piston unit. Such a modified setup is shown in Fig. 8. Motors operated by fluid under pressure are well known in the art and my mechanism without change can be used to control fluid going into (for one direction of rotation) and to control fluid coming out (for the other direction of rotation) exactly as in the previous example.

It might be explained with reference to Fig. 8 that bracket 51 is connected to the carriage or other moving element and the cam blade 53 is therefore pulled through cam shoe 58, as before, to bring cam 66 in contact with plunger 39 and control the flow through valve 34.

In Fig. 8 also it will be noted that tube 37' is equivalent to passage 37 from the valve to the cylinder in Fig. 4, the only change being that the valve 34 is not cast integral with the motor 120 in Fig. 8 but is separate from it.

Having thus described my invention what I claim as new and desire to secure by Letters Patent is:—

1. In a hydraulic control mechanism, a carriage, a motor operated by fluid under pressure for moving said carriage, a conduit carrying fluid under pressure to said motor for one direction of movement of said carriage and providing a fluid outlet for the opposite direction of movement, a plunger valve for controlling the quantity of flow through said conduit, a cam mounted for movement with said carriage, a control element of said plunger valve contacting said cam to produce variation in quantity of fluid flowing to and from said motor and means responsive to the reverse movement of said carriage for rendering said cam inoperative.

2. In a mechanism of the character described, a carriage, a fluid operated motor for moving said carriage, a valve for controlling flow of fluid through said motor, a cam member movable with said carriage, a stationary projection adjacent said cam member, a floating wedge between said cam member and said stationary projection in frictional contact with said cam member and so disposed as to hold said cam member in one operative position relative to said controlling valve on forward movement of said carriage but in another operative position to vary the rate of flow on reverse movement of said carriage.

3. In combination a valve for controlling flow through hydraulic motors with means for operating said valve comprising a control element in said valve for varying fluid flow therethrough, a carriage, a contacting member moving with said carriage for actuation of said control element, means locating said contacting member in fixed position relative to said control element on forward movement of said carriage, a floating wedge between said locating means and said contacting member so disposed as to change the position of said contacting member relative to said control element when said carriage is reversed.

OSCAR G. TWEDDELL.